US011385356B2

(12) United States Patent
McDonald et al.

(10) Patent No.: US 11,385,356 B2
(45) Date of Patent: Jul. 12, 2022

(54) SYSTEM FOR DETECTING SIGNAL SPOOFING BY MONITORING FOR ABNORMAL DIVERGENCE IN PSEUDORANGE VALUES

(71) Applicant: Honeywell International Inc., Morris Plains, NJ (US)

(72) Inventors: James Arthur McDonald, New Brighton, MN (US); Karl Abraham Keyzer, Minneapolis, MN (US); Anthony Pritchard, Coon Rapids, MN (US)

(73) Assignee: Honeywell International Inc., Charlotte, NC (US)

( * ) Notice: Subject to any disclaimer, the term of this patent is extended or adjusted under 35 U.S.C. 154(b) by 76 days.

(21) Appl. No.: 16/937,383

(22) Filed: Jul. 23, 2020

(65) Prior Publication Data
US 2022/0026579 A1     Jan. 27, 2022

(51) Int. Cl.
*G01S 19/21* (2010.01)
*G01S 19/39* (2010.01)
*G01S 19/40* (2010.01)

(52) U.S. Cl.
CPC .......... *G01S 19/215* (2013.01); *G01S 19/393* (2019.08); *G01S 19/40* (2013.01)

(58) Field of Classification Search
CPC ...... G01S 19/215; G01S 19/393; G01S 19/40; H04B 7/18519; H04B 7/18513
(Continued)

(56) References Cited

U.S. PATENT DOCUMENTS

| 5,557,284 A | 9/1996 | Hartman |
| 6,408,245 B1 | 6/2002 | An et al. |

(Continued)

FOREIGN PATENT DOCUMENTS

| CN | 110715660 A | 1/2020 |
| EP | 2746813 B1 | 8/2017 |
| EP | 3428688 A1 | 1/2019 |

OTHER PUBLICATIONS

Ahmad, Mukhtar et al., "Impact and Detection of GPS Spoofing and Countermeasures Against Spoofing", 2019 International Conference on Computing, Mathematics and Engineering Technologies—ICoMET 2019, 978-1-5386-9509-8/19, (c) 2019 IEEE, pp. 1 through 8.

(Continued)

*Primary Examiner* — Shaima Q Aminzay
(74) *Attorney, Agent, or Firm* — Fogg & Powers LLC (57) ABSTRACT

A spoofing detection system including at least one antenna, a receiver and a controller is provided. The at least one receiver is in communication with the at least one antenna to receive detected satellite signals. The controller is configured to determine raw pseudorange values from the received satellite signals. The controller is further configured to apply at least one first filter on the raw pseudorange values to generate at least an output of first filtered pseudorange values. The controller is also conjured to compare an output of the first filtered pseudorange values with one of the raw pseudorange values and second filtered pseudorange values from a second filter. The controller is further configured to determine if spoofing is present in the received satellite signals based on a determined divergence between the output of first filtered pseudorange values and one of the raw pseudorange values and the second filtered pseudorange values.

20 Claims, 5 Drawing Sheets

(58) Field of Classification Search
USPC .......................................................... 455/295
See application file for complete search history.

(56) References Cited

U.S. PATENT DOCUMENTS

| | | | |
|---|---|---|---|
| 6,417,802 B1 | 7/2002 | Diesel | |
| 7,940,210 B2 | 5/2011 | Fly et al. | |
| 10,094,930 B2* | 10/2018 | Schipper | ................ G01S 19/29 |
| 10,365,376 B2 | 7/2019 | Lee et al. | |
| 2005/0234644 A1 | 10/2005 | Lin | |

OTHER PUBLICATIONS

European Patent Office, "Extended European Search Report from EP Application No. 21184389.1", from Foreign Counterpart to US Application No. 16/937,383, dated Dec. 21, 2021, pp. 1 through 10, Published: EP.
Liu, Y. et al., "Ins-Aided GNSS Spoofing Detection Based on Two Antennna Raw Measurements", ISSN 2075-1087, Gyroscopy and Navigation, 2016, vol. 7, No. 2, pp. 178 through 188, (c) Pleiades Publishing, Ltd., 2016.
RTCA, "Minimum Operational Performance Standards For GPS Local Area Augmentation System Airborne Equipment", RTCA DO-253C, Prepared by: SC-159, Dec. 16, 2008, pp. 1 through 4, RTCA, Inc.

* cited by examiner

SYSTEM FOR DETECTING SIGNAL SPOOFING BY MONITORING FOR ABNORMAL DIVERGENCE IN PSEUDORANGE VALUES

BACKGROUND

Global Positioning Satellite (GPS) signals are susceptible to jamming and spoofing from earth based sources. Spoofing radio frequency waveforms mimic true signals and are able to overcome weaker (true) signals originating from satellites in space. The spoofing radio frequency waveforms may deny, degrade, disrupt, or deceive operation of a GPS receiver. This can lead to unacceptably large errors in GPS receiver "snapshot" navigation solutions as well as tightly integrated INS/GPS navigation solution errors that may lead to a loss of integrity for of a navigation solution.

Spoofing signals may be generated as a deliberate act or may be an unintentional consequence of a signal generating source. For example, it is common to generate test GPS signals within aircraft maintenance hangars, so technicians providing maintenance on GPS receiver equipment, have reference test signals for the GPS receiver equipment to receive. If a hangar door is left open or the generated GPS test signals are too strong, usually as the result of faulty equipment, the signals may reach out beyond the hangar causing potential spoofing situations in nearby GPS receivers.

SUMMARY

The following summary is made by way of example and not by way of limitation. It is merely provided to aid the reader in understanding some of the aspects of the subject matter described. Embodiments provide a divergence monitor system that determines if a GPS signal is being spoofed by monitoring divergences between two sets of pseudorange values in which at least one set of pseudorange values are smoothed with a filter.

In one embodiment, a system for detecting signal spoofing by monitoring for abnormal divergence in pseudorange values is provided. The system includes at least one antenna, at least one receiver and a controller. The at least one antenna is configured to detect satellite signals from a plurality of satellites. The at least one receiver is in communication with the at least one antenna to receive the detected satellite signals. The controller is in communication with the at least one receiver. The controller is configured to determine raw pseudorange values from the received satellite signals. The controller is further configured to apply at least one first filter on the raw pseudorange values to generate at least an output of first filtered pseudorange values. The controller is conjured to compare an output of the first filtered pseudorange values with one of the raw pseudorange values and second filtered pseudorange values from a second filter. The controller is further configured to determine if spoofing is present in the received satellite signals based on a determined divergence between the output of first filtered pseudorange values and one of the raw pseudorange values and the second filtered pseudorange values.

In another example embodiment, a method of determining if received satellite signals are being spoofed is provided. The method includes determining raw pseudorange values from received satellite signals; communicating the raw pseudorange values to a first path and a second path; smoothing the raw pseudorange values with a filter in at least one of the first and second paths; and determining if spoofing is occurring based on a detected divergence between outputs in the first and second paths.

In yet another embodiment, a method of operating a vehicle with a system for detecting signal spoofing by monitoring for abnormal divergence in pseudorange values is provided. The method including receiving satellite signals with at least one receiver; determining raw pseudorange values from the received satellite signals; applying a first filter to the determined raw pseudorange values to generate first smoothed pseudorange values; applying a second filter to the determined raw pseudorange values to generate second smoothed pseudorange values, the second filter having different filter characteristics than the first filter; determining if spoofing is occurring based on a detected divergence between the first smoothed pseudorange values and the second smoothed pseudorange values; and controlling a navigating system of the vehicle based in part on determined spoofing.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a system for detecting signal spoofing by monitoring for abnormal divergence in pseudorange values of satellite signals. The system compares divergences between two sets of generated pseudorange values from received satellite signals. The two sets of generated pseudorange values may be different as the result of at least one set of raw pseudorange values being smoothed by at least one filter as described in detail below. Based on divergences between monitored pseudorange values, spoofing is determined.

Figure 1:
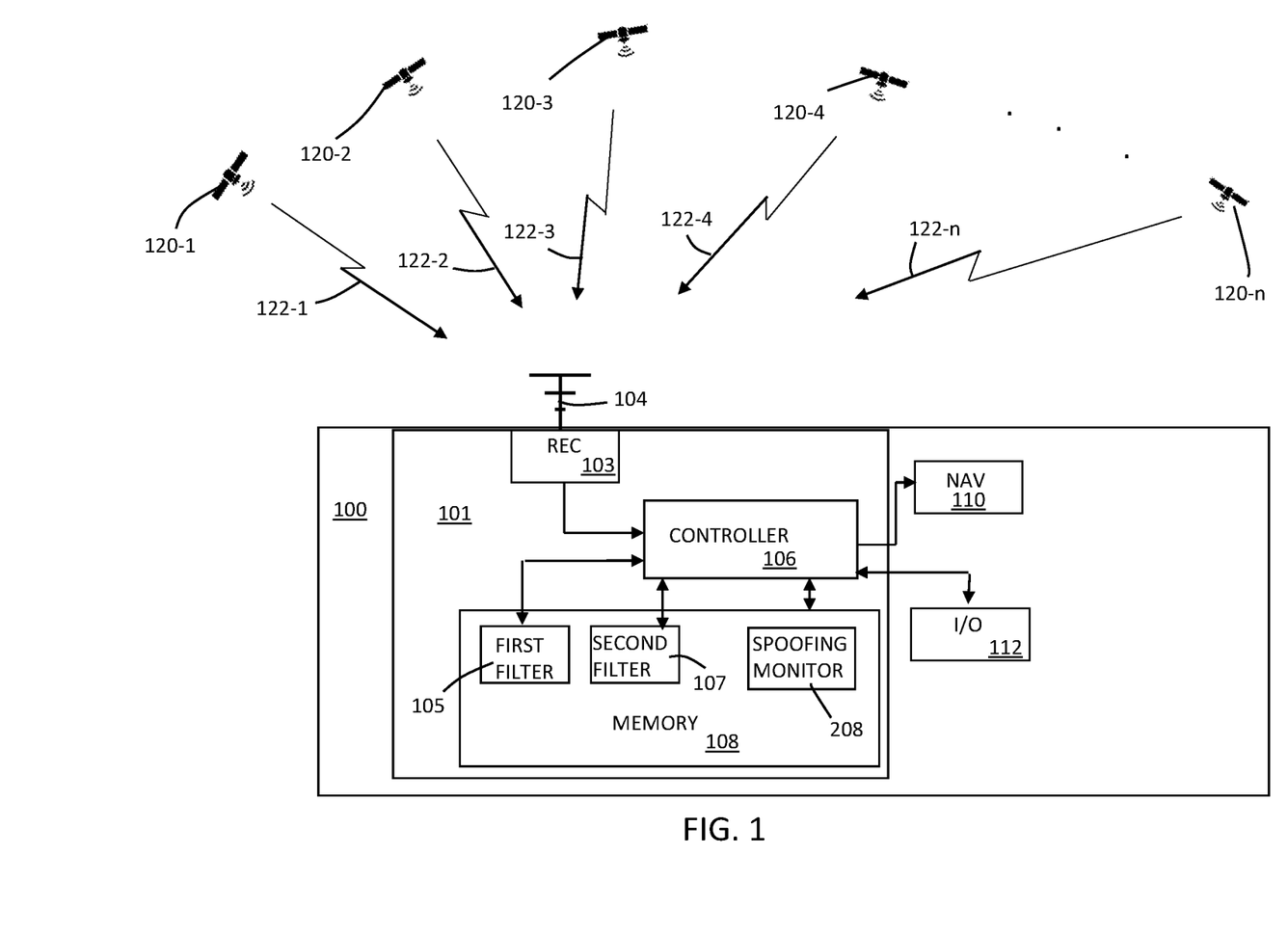
FIG. 1 is a block diagram of a vehicle incorporating a system for detecting signal spoofing by monitoring for abnormal divergence in pseudorange values according to one exemplary embodiment.

Referring to FIG. 1, a vehicle 100 having a system 101 for detecting signal spoofing by monitoring for abnormal divergence in pseudorange measurements of an example embodiment is illustrated. The vehicle may be an avionic aircraft, such as but not limited to a plane or drone, a land based vehicle, such as but not limited to a car or truck, or a water based vehicle such as but not limited to a ship.

The vehicle 100 in this example, includes at least one antenna 104 to detect satellite signals 122-1 through 122-n from satellites 120-1 through 120-n. The satellite signals can generally be identified by 122. Similarly, the satellites can be generally identified by 120. A receiver 103 is in communication with the antenna 104 to receive the detected satellite signals 122. A controller 106, that is communication with the receiver 103, is configured to process the satellite signals 122 from each satellite 120 to determine raw pseudorange values associated satellite with the satellite signals 122 based on instructions stored in memory 108. The raw pseudorange values may be raw pseudorange measurements or a rate of change of the raw pseudorange measurements. A raw pseudorange measurement may be determined by multiplying the speed of light by the time it took for the satellite signal 122 to travel from an associated satellite 120. Since there are many physical effects that occur that may result in synchronization errors between the receiver and satellite clocks, the range determined is a raw pseudorange measurement instead of a true range measurement. The controller 106 may also determine the rate of change of the raw pseudorange measurements when used for the raw pseudorange values. For example, if two consecutive pseudorange measurements are determine as 20,000,000 m and 20,000,100 m over one second, the controller 106 would determine the raw pseudorange value to be (200,000,100-20,000,000)/1=100 m/s.

In general, the controller 106 may include any one or more of a processor, microprocessor, a digital signal processor (DSP), an application specific integrated circuit (ASIC), a field program gate array (FPGA), or equivalent discrete or integrated logic circuitry. In some example embodiments, controller 106 may include multiple components, such as any combination of one or more microprocessors, one or more controllers, one or more DSPs, one or more ASICs, one or more FPGAs, as well as other discrete or integrated logic circuitry. The functions attributed to the controller 106 herein may be embodied as software, firmware, hardware or any combination thereof. The controller 106 may be part of a system controller or a component controller, such as but not limited to, the receiver controller. The memory 108 may include computer-readable operating instructions that, when executed by the controller provides functions for a system for detecting signal spoofing by monitoring for abnormal divergence in pseudorange values. Such functions may include the code for functions of determining raw pseudorange values, filtering the raw pseudorange values (first and second filters 105 and 107), monitoring for divergence between two sets of pseudorange values and determining if spoofing is present based on monitored divergences. The computer readable instructions may be encoded within the memory 108. Memory 108 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

As discussed above, the controller 106 is configured to determine raw pseudorange values from the satellite signals 122. In one embodiment, the controller 106 is configured to apply a first slow filter 105 to the raw pseudorange values and a second fast filter 107 to the raw pseudorange values. In this example, the first filter 105 and the second filter 107 are digital filters applied to the raw pseudorange values via instructions saved in the memory 108. The first filter 105 in an example uses a first time constant that is slower than a time constant used in the second filter 107. The controller 106 is configured, based on the instructions stored in memory 108, to monitor divergences between two different sets of smoothed pseudorange values output from the first and second filters 105 and 107 associated with a satellite signal 122.

The first filter 105 with the slow, or longer, time constant, will filter out (smooth out) most of the noise. The second filter 107, with the fast or shorter time constant, allows most noise determined in the raw pseudorange values to pass through in the filtered (or smoothed) pseudorange values. Essentially, an output of smoothed pseudorange values from the first filter 105, with the slower time constant, retains more memory of the past true satellite signal than the second filter 107 with the faster time constant. As a spoofing signal starts, the first filter 105, with the slower time constant, outputs smoothed pseudorange values that are based not only on the recently received spoofing signal but also the past true satellite signals while the second filter, with the fast time constant, outputs smoothed pseudorange values that is more based on the recently received spoofing signal than the past true satellite signals. This difference in the outputs of the filters 105 and 107 allows for the detection of a spoofing signal with a spoofing monitor 208. As discussed below in detail, the controller 106 is configured to monitor the smoothed pseudorange measurements outputs of the filters 107 and 105 to determine divergences that may indicate a spoofing signal is present. In other embodiments, as discussed below, only one filter is used. In this embodiment an output of the filter is compared with the raw pseudorange values.

Further illustrated in FIG. 1 is an input/output 112 which provides a communication link between an operator and the controller 106. The input/output may include an information input device, such as but not limited to, a keyboard and an output device, such as, but not limited to, a display. Also illustrated in this example embodiment is a navigation system 110 that is in communication with the controller 106. The navigation system 110 may include navigation controls used to control the steering of the vehicle 100. The navigation system 110 further may include a location system that uses the pseudorange measurements determined by the controller to determine a location of the vehicle 100. In one embodiment, controller 106 is configured to determine location information and then pass it on the navigation system 110. In some embodiments the controller is configured to control the navigation system 110 based at least in part on detected spoofing associated with a satellite signal 122. The control of the navigation system 110 may include, but is not limited to, removing a satellite signal 122 associated with a detected spoofing signal from a location determination and providing a spoofing alert to an operator via display in the input/output 112 or the navigation system 110. The alarm may provide the operator with information regarding the integrity of a determined location.

Figure 2A:
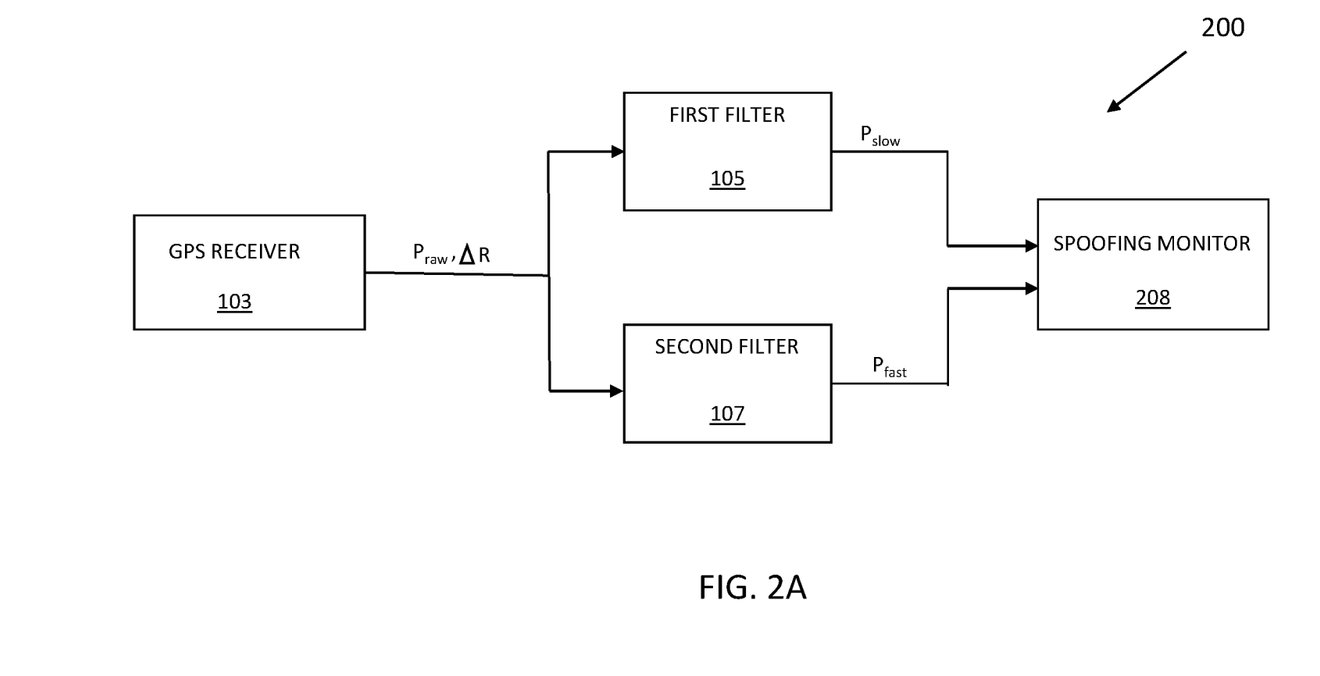
FIG. 2A is a block diagram a system for detecting signal spoofing by monitoring for abnormal divergence in pseudorange values according to one exemplary embodiment.

An example of a system 200 for detecting signal spoofing by monitoring for abnormal divergence in pseudorange values is illustrated in FIG. 2A. In this example, GPS receiver 103 receives a raw pseudorange value $P_{raw}$ and a corresponding delta range measurement $\Delta R$ in an embodiment that outputs raw pseudorange measurements. In an embodiment where the raw pseudorange value $P_{raw}$ is a rate of change of the pseudorange measurement (pseudorange rate) a delta rage $\Delta R$ may not be used for smoothing.

A delta range $\Delta R$ is carrier or phase-based information contained in satellite signal 122 that may be used in a filter to smooth a pseudorange to a more accurate measurement when the raw pseudorange $P_{raw}$ measurement is used. The raw pseudorange measurement $P_{raw}$ and delta range measurement $\Delta R$ are passed to both the first filter 105 and the second filter 107 in this example embodiment. As discussed above, the first filter 105 is the slow filter (has a slow time constant) and the second filter 107 is the fast filter (has a fast time constant). In an embodiment, the first filter 105 and the second filter 107 are digital filters implemented by the controller 106 using equations stored in memory 108. An example equation implemented by the controller 106 for the first filter 105 includes:

$$P_{slow}(n) = \frac{\Delta t}{\tau_{slow}} P_{raw} + \left(1 - \frac{\Delta t}{\tau_{slow}}\right)(P_{slow}(n-1) + \Delta R)$$

An example equation implemented by the controller 106 for the second filter 107 includes:

$$P_{fast}(n) = \frac{\Delta t}{\tau_{fast}} P_{raw} + \left(1 - \frac{\Delta t}{\tau_{fast}}\right)(P_{fast}(n-1) + \Delta R)$$

Where $P_{slow}$=smoothed pseudorange (slow time constant).

Where $P_{fast}$=smoothed pseudorange (fast time constant).

Where $\Delta t$=Sample time, which may be in example, approximately 1 second

Where n=current epoch

Where n−1=previous epoch

Where $\tau_{slow}$=a slow time, for example approximately 100 seconds

Where $\tau_{fast}$=a fast time, for example approximately 10 seconds.

The times provided above are merely provided as examples. Any time values can be used that accomplish a divergence when a spoofing signal is present. In one embodiment, spoofing is determined with a spoofing monitor 208 with the controller 106 implementing instructions stored in the memory 108. In this example, the spoofing monitor determines if a divergence between $P_{slow}$ and $P_{fast}$ reaches or is greater than a threshold. For example, if $|P_{slow}-P_{fast}|>30$ m, possible spoofing is present.

In another embodiment, spoofing is determined with the spoofing monitor 208 by monitoring the rate of change of the divergence (or difference) in the filtered (or smoothed) pseudorange measurements. For example, the controller may implement the following equation:

$$dPRate_{slow,fast}(n) = \frac{dP_{slow,fast}(n) - dP_{slow,fast}(n-k)}{k\Delta t}$$

-continued

Where $dP_{slow,fast}(n) = P_{slow}(n) - P_{fast}(n)$.

Further where k is the number of samples over which to compute the rate and $\Delta t$ is the time interval between samples. In practice the quantity $k\Delta t$ may be in the order of 20 seconds. The rate change monitor implemented by the controller 106 may be:

If $|dPRate_{slow,fast}|>1$ m/s, then possible spoofing is present. The use of 1 m/s is just one possible value.

Figure 2B:
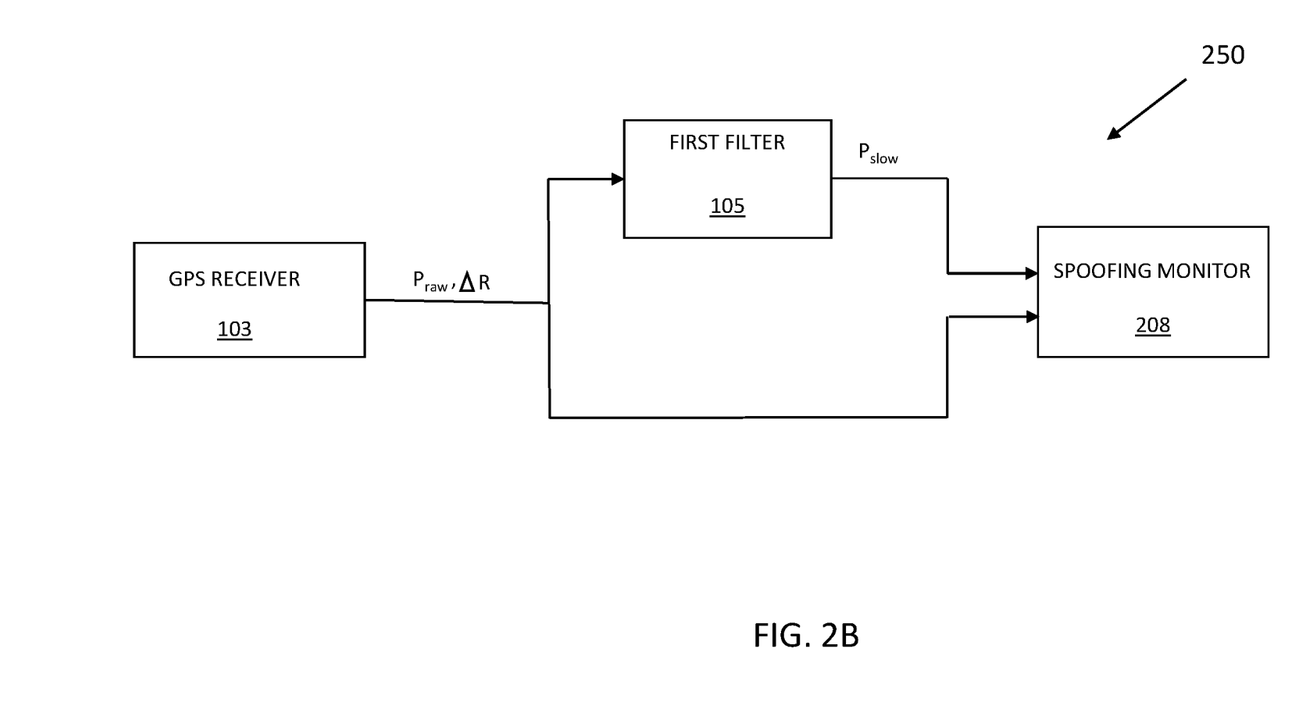
FIG. 2B is a block diagram of a system for detecting signal spoofing by monitoring for abnormal divergence in pseudorange values according to another exemplary embodiment.

The above example embodiments effectively exploit the divergence of raw (or "fast") pseudorange measurements from carrier smoothed (or slow) pseudorange measurements using a first and second filter 105 and 107. FIG. 2B illustrates a block diagram of another system 250 for detecting signal spoofing by monitoring for abnormal divergence in pseudorange values. In this embodiment, only one filter 105 is used. The raw pseudorange values from the GPS receiver 103 are communicated to filter 105 and an input to the spoofing monitor 208. An output of filter 105 is communicated to another input of the spoofing monitor 208. Since the raw pseudorange values are basically a single sample average and the smoothed pseudorange values output from the filter 105 are an average that is based not only on the recently received spoofing signal but also the past true satellite signals, divergences between the two sets of pseudorange values will occur. The spoofing monitor 208 monitors for divergences in the pseudorange values. In embodiments described above, either an output of a fast filter or even the raw pseudorange values are compared with outputs of a slow filter. An example of a slow filter is a filter with around a 100 s time constant.

Figure 3:
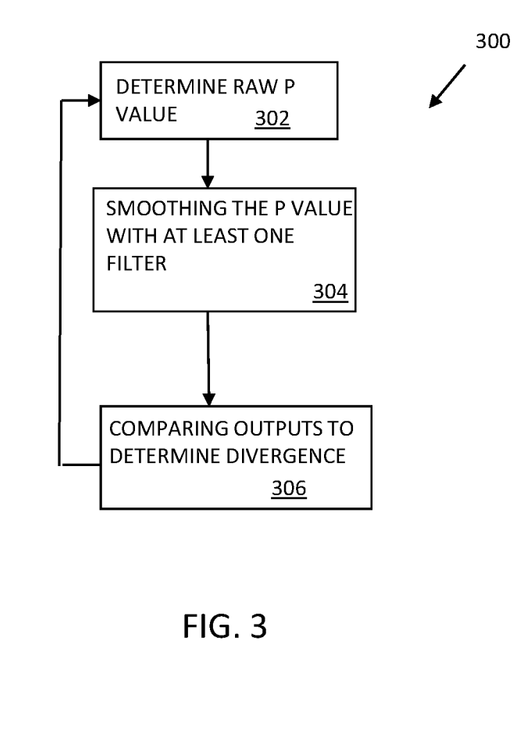
FIG. 3 is a divergence determining flow diagram according to one exemplary embodiment.
Figure 4:
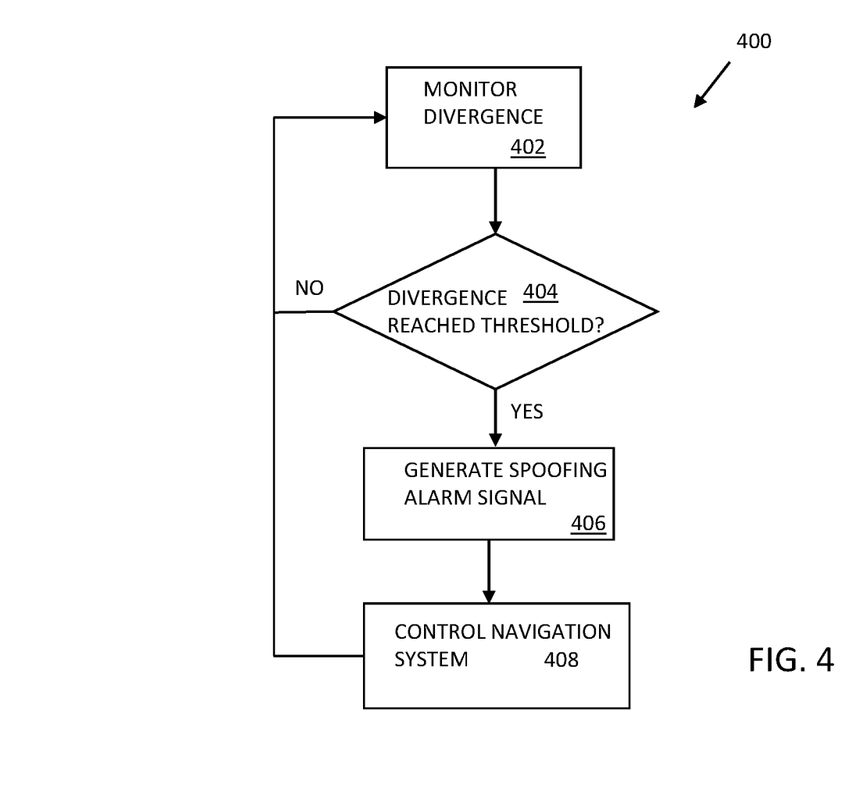
FIG. 4 is a spoofing determination flow diagram according to one exemplary embodiment.
Figure 5:
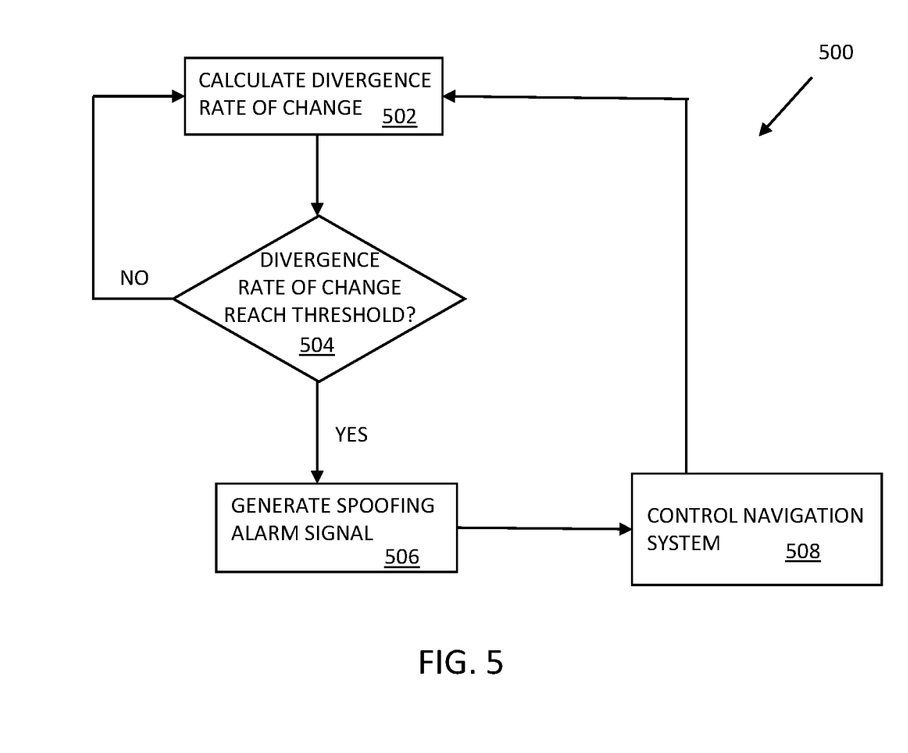
FIG. 5 is spoofing determination flow diagram according to another exemplary embodiment.

FIGS. 3 through 5 illustrated different flow diagrams 300, 400 and 500 that correlate to the divergence and spoofing determining processes described above. The flow diagrams 300, 400 and 500 are provided as a series of sequential blocks. The sequence of the blocks may be different or may run parallel with each other in other embodiments. Hence, embodiments are not limited to the sequence of blocks illustrated in flow diagrams 300, 400 and 500.

Referring to FIG. 3, a divergence determining flow diagram 300 according to one exemplary embodiment is illustrated. In this example embodiment, the process starts by determining raw pseudorange values from received satellite signals 122, at block (302). The process continues at block (304) by filtering or smoothing out the raw pseudorange values with at least one filter. Outputs of the filtering are monitored at block (306) to determine divergences. Some, embodiments compare two different pseudorange values, that are determined with different filter properties, such as different time constant or sampling rates, so differences that may result from spoofing (because one set of values will be more susceptible to the spoofing signal information) can be identified. In another embodiment, the raw pseudorange values, may be compared to filtered pseudorange values.

An example of a spoofing determination flow diagram 400 according to one embodiment is illustrated in FIG. 4. In this example, the process starts at block (402) monitoring for divergence between two different pseudorange values. As discussed above, the two different pseudorange values, may come from an output of two different filters having different filtering properties or may come from the raw pseudorange values and the output of one filter. In block (404) it is determined if a divergence has reached threshold. If the divergence has not reached the threshold at block (404), the process continues at block (402) monitoring for divergences.

If it is determined at block (404) the divergence has reached the threshold, this embodiment generates a spoofing alarm signal at block (406). In one example embodiment, the spoofing alarm signal is used, a least in part, in the control of a navigation system of the vehicle at block (408). This may include, but is not limited to, providing a warning to an operator of the vehicle, removing pseudorange measurements associated with detected spoofing when determining vehicle location and controlling at least in part navigation of the vehicle.

Another, spoofing determination flow diagram 500 according to one embodiment is illustrated in FIG. 5. In this embodiment, the process starts at block (502) by monitoring for divergence in the pseudorange values in an embodiment. As discussed above, the two different pseudorange values, may come from an output of two different filters each having different filtering properties or may come from the raw pseudorange values, and the output of one filter. In this embodiment, it is determined if a rate of change in the divergence is greater than a threshold at block (504). If the rate of change is not above the threshold at block (504), the process continues at block (502) monitoring the divergence. If, however, the rate of change has reached the threshold at block (504), a spoofing alarm signal is generated at block (506). As with the embodiment described above, the spoofing alarm signal may be used to at least in part control a navigation system of the vehicle 100 at block (508). The process then continues at block (502) monitoring for divergence.

EXAMPLE EMBODIMENTS

Example 1 includes a system for detecting signal spoofing by monitoring for abnormal divergence in pseudorange values. The system includes at least one antenna, at least one receiver and a controller. The at least one antenna is configured to detect satellite signals from a plurality of satellites. The at least one receiver is in communication with the at least one antenna to receive the detected satellite signals. The controller is in communication with the at least one receiver. The controller is configured to determine raw pseudorange values from the received satellite signals. The controller is further configured to apply at least one first filter on the raw pseudorange values to generate at least an output of first filtered pseudorange values. The controller is conjured to compare an output of the first filtered pseudorange values with one of the raw pseudorange values and second filtered pseudorange values from a second filter. The controller is further configured to determine if spoofing is present in the received satellite signals based on a determined divergence between the output of first filtered pseudorange values and one of the raw pseudorange values and the second filtered pseudorange values.

Example 2 includes the system of Example 1, wherein the pseudorange values are one of pseudorange measurements and rate of change of pseudorange measurements.

Example 3 includes system of Example 2, further wherein the second filter has different filtering properties than the first filter, the different filtering properties including one of different time constants and different sample rates.

Example 4 includes the system of any of the Examples 1-3, further wherein the at least one of the first filter and the second filter is configured to smooth the raw pseudorange values with a delta range.

Example 5 includes the system of any of the Examples 1-4, wherein at least one of the first and second filters is an electronic filter.

Example 6 includes the system of any of the Examples 1-5, further including a memory to at least store operating instructions. The controller in communication with the memory to implement the operating instructions.

Example 7 includes the system of any of the examples 1-6, further including an input/output in communication with the controller. The input/output providing a communication link between an operator and the controller.

Example 8 includes the system of any of the examples 1-7, further including a navigation system configured to provide navigation functions of a vehicle based at least in part on a determination by the controller if spoofing is present.

Example 9 includes a method of determining if received satellite signals are being spoofed. The method includes determining raw pseudorange values from received satellite signals; communicating the raw pseudorange values to a first path and a second path; smoothing the raw pseudorange values with a filter in at least one of the first and second paths; and determining if spoofing is occurring based on a detected divergence between outputs in the first and second paths.

Example 10 includes the method of Example 9, wherein smoothing the raw pseudorange values with a filter in at least one of the first and second paths, further includes applying a delta range with the filter to smooth out the raw pseudorange values in the at least one of the first and second paths.

Example 11 includes the method of any of the Examples 9-10, wherein determining spoofing is occurring further includes comparing detected divergence differences between the output in the first path and the output in a second path against a predetermined threshold that indicates spoofing is present.

Example 12 includes the method of any of the Examples 9-10, wherein determining if spoofing is occurring further includes determining a rate of change of the divergence; and comparing the rate of change of the divergence to a predetermined rate of change that indicates spoofing is present.

Example 13 includes the method of an Examples 9-12, wherein smoothing the raw pseudorange values with the filter in at least one of the first and second paths further includes filtering the raw pseudorange values in the first path with a first filter having a first filtering property to determine first smoothed range values and filtering the pseudorange values in the second path with a second filter with a second filter property to determine second smoothed pseudorange values, wherein the second filter property is different than the first filter property.

Example 14 includes the method of Example 13, wherein the first and second filter properties are one of time constant properties and sample rate properties.

Example 15 includes the method of Example 9, further including smoothing the raw pseudorange measurements in both the first and second paths by filtering the raw pseudorange values in the first path with a first filter having a first time constant to determine first smoothed range values and filtering the pseudorange values in the second path with a second filter with a second time constant to determine second smoothed pseudorange values, wherein the second time constant is slower than the first filter property; and detecting an abnormal divergence in the first smoothed range values and the second smoothed pseudorange values in determining if spoofing is occurring.

Example 16 includes a method of operating a vehicle with a system for detecting signal spoofing by monitoring for abnormal divergence in pseudorange values. The method including receiving satellite signals with at least one receiver; determining raw pseudorange values from the received satellite signals; applying a first filter to the determined raw pseudorange values to generate first smoothed pseudorange values; applying a second filter to the determined raw pseudorange values to generate second smoothed pseudorange values, the second filter having different filter characteristics than the first filter; determining if spoofing is occurring based on a detected divergence between the first smoothed pseudorange values and the second smoothed pseudorange values; and controlling a navigating system of the vehicle based in part on determined spoofing.

Example 17 includes the method of Example 16, wherein the different filter characteristics includes one of time constant and sample rate characteristics.

Example 18 includes the method of any of the Examples 16-17, wherein controlling the navigation system further comprises one of generating a spoofing alert signal, displaying a spoofing alert, ignoring pseudorange measurements associated is determined spoofing and controlling navigation of the vehicle based at least in part on determined spoofing.

Example 19 includes the method of any of the Examples 16-18, wherein determining spoofing is occurring further includes comparing detected divergence differences between the first smoothed pseudorange values output from the first filter and the second smoothed pseudorange values output from the second filter against a predetermined threshold that indicates spoofing is present.

Example 20 includes the method of any of the Examples 16-18, wherein determining spoofing is occurring further includes determining a rate of change of the divergence; and comparing the rate of change of the divergence to a predetermined rate of change that indicates spoofing is present.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A system for detecting signal spoofing by monitoring for abnormal divergence in pseudorange values, the system comprising:
    at least one antenna configured to detect satellite signals from a plurality of satellites;
    at least one receiver in communication with the at least one antenna to receive the detected satellite signals; and
    a controller in communication with the at least one receiver, the controller configured to determine raw pseudorange values from the received satellite signals, the controller further configured to apply at least one first filter on the raw pseudorange values to generate an output of first filtered pseudorange values, the controller configured to compare the output of the first filtered pseudorange values with one of the raw pseudorange values and second filtered pseudorange values from a second filter, the controller further configured to determine if spoofing is present in the received satellite signals based on a determined divergence between the output of first filtered pseudorange values and one of the raw pseudorange values and the second filtered pseudorange values.

2. The system of claim 1, wherein the pseudorange values are one of pseudorange measurements and rate of change of pseudorange measurements.

3. The system of claim 1, further wherein the second filter has different filtering properties than the first filter, the different filtering properties including one of different time constants and different sample rates.

4. The system of claim 1, further wherein the at least one of the first filter and the second filter is configured to smooth the raw pseudorange values with a delta range.

5. The system of claim 1, wherein at least one of the first and second filters is an electronic filter.

6. The system of claim 1, further comprising:
    a memory to at least store operating instructions, the controller in communication with the memory to implement the operating instructions.

7. The system of claim 1, further comprising:
    an input/output in communication with the controller, the input/output providing a communication link between an operator and the controller.

8. The system of claim 1, further comprising:
    a navigation system configured to provide navigation functions of a vehicle based at least in part on a determination by the controller if spoofing is present.

9. A method of determining if received satellite signals are being spoofed, the method comprising:
    determining raw pseudorange values from received satellite signals;
    communicating the raw pseudorange values to a first path and a second path;
    smoothing the raw pseudorange values with a filter in at least one of the first and second paths; and
    determining if spoofing is occurring based on a detected divergence between outputs in the first and second paths.

10. The method of claim 9, wherein smoothing the raw pseudorange values with a filter in at least one of the first and second paths, further comprises:
    applying a delta range with the filter to smooth out the raw pseudorange values in the at least one of the first and second paths.

11. The method of claim 9, wherein determining spoofing is occurring further comprises:
    comparing detected divergence differences between the output in the first path and the output in a second path against a predetermined threshold that indicates spoofing is present.

12. The method of claim 9, wherein determining if spoofing is occurring further comprises:
    determining a rate of change of the divergence; and
    comparing the rate of change of the divergence to a predetermined rate of change that indicates spoofing is present.

13. The method of claim 9, wherein smoothing the pseudorange values in at least one of the first and second paths further comprises:
    filtering the raw pseudorange values in the first path with a first filter having a first filtering property to determine first smoothed range values and filtering the raw pseudorange values in the second path with a second filter with a second filter property to determine second smoothed pseudorange values, wherein the second filter property is different than the first filter property.

14. The method of claim 13, wherein the first and second filter properties are one of time constant properties and sample rate properties.

15. The method of claim 9, further comprising:
    smoothing the raw pseudorange values in both the first and second paths by filtering the raw pseudorange values in the first path with a first filter having a first time constant to determine first smoothed range values and filtering the raw pseudorange values in the second path with a second filter with a second time constant to determine second smoothed pseudorange values, wherein the second time constant is slower than the first time constant; and detecting an abnormal divergence in the first smoothed range values and the second smoothed pseudorange values in determining if spoofing is occurring.

16. A method of operating a vehicle with a system for detecting signal spoofing by monitoring for abnormal divergence in pseudorange values, the method comprising:

receiving satellite signals with at least one receiver;

determining raw pseudorange values from the received satellite signals;

applying a first filter to the determined raw pseudorange values to generate first smoothed pseudorange values;

applying a second filter to the determined raw pseudorange values to generate second smoothed pseudorange values, the second filter having different filter characteristics than the first filter;

determining if spoofing is occurring based on a detected divergence between the first smoothed pseudorange values and the second smoothed pseudorange values; and controlling a navigating system of the vehicle based in part on determined spoofing.

17. The method of claim 16, wherein the different filter characteristics includes one of time constant and sample rate characteristics.

18. The method of claim 16, wherein controlling the navigation system further comprises one of generating a spoofing alert signal, displaying a spoofing alert, ignoring pseudorange measurements associated is determined spoofing and controlling navigation of the vehicle based at least in part on determined spoofing.

19. The method of claim 16, wherein determining spoofing is occurring further comprises:

comparing detected divergence differences between the first smoothed pseudorange values from the first filter and the second smoothed pseudorange values from the second filter against a predetermined threshold that indicates spoofing is present.

20. The method of claim 16, wherein determining spoofing is occurring further comprises:

determining a rate of change of the divergence; and comparing the rate of change of the divergence to a predetermined rate of change that indicates spoofing is present.

* * * * *